(12) United States Patent
Lo et al.

(10) Patent No.: US 10,981,808 B2
(45) Date of Patent: Apr. 20, 2021

(54) CHLORINATION SYSTEMS

(71) Applicant: ZODIAC POOL SYSTEMS LLC, Vista, CA (US)

(72) Inventors: Ricky Lo, Carlsbad, CA (US); Mark Bauckman, San Marcos, CA (US); Hwa Heng, Vista, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 281 days.

(21) Appl. No.: 16/174,718

(22) Filed: Oct. 30, 2018

(65) Prior Publication Data

US 2019/0127241 A1  May 2, 2019

Related U.S. Application Data

(60) Provisional application No. 62/580,200, filed on Nov. 1, 2017.

(51) Int. Cl.

| | | |
|---|---|---|
| *C02F 1/46* | (2006.01) | |
| *C02F 1/467* | (2006.01) | |
| *C25B 1/26* | (2006.01) | |
| *E04H 4/12* | (2006.01) | |
| *C25B 15/02* | (2021.01) | |
| *C02F 103/42* | (2006.01) | |

(52) U.S. Cl.
CPC .......... *C02F 1/4602* (2013.01); *C02F 1/4674* (2013.01); *C25B 1/26* (2013.01); *C25B 15/02* (2013.01); *E04H 4/1281* (2013.01); *C02F 2103/42* (2013.01); *C02F 2201/4614* (2013.01); *C02F 2201/46145* (2013.01); *C02F 2209/02* (2013.01); *C02F 2209/40* (2013.01); *C02F 2303/04* (2013.01)

(58) Field of Classification Search
CPC ..................... C02F 2201/46145; C02F 1/4602
See application file for complete search history.

(56) References Cited

U.S. PATENT DOCUMENTS

| | | | |
|---|---|---|---|
| 6,391,167 B1 | 5/2002 | Grannersberger | |
| 8,920,615 B2 | 12/2014 | Davidson et al. | |
| 10,144,660 B2* | 12/2018 | Deloche | ................ E04H 4/1281 |
| 10,155,679 B2* | 12/2018 | Mastio | ................ C02F 1/4674 |
| 10,513,447 B2* | 12/2019 | Buzaglo | ................ C02F 1/4674 |
| 2006/0249400 A1 | 11/2006 | Bremauer | |
| 2015/0203376 A1 | 7/2015 | Heng et al. | |
| 2016/0304365 A1* | 10/2016 | Marshall | ............... C02F 1/4674 |

OTHER PUBLICATIONS

PCT/US2018/058151, "International Search Report and Written Opinion", dated Jan. 30, 2019,12 pages.
International Application No. PCT/US2018/058151, International Preliminary Report on Patentability, dated May 14, 2020, 8 pages.

* cited by examiner

*Primary Examiner* — Nicholas A Smith
(74) *Attorney, Agent, or Firm* — Kilpatrick Townsend & Stockton LLP; Dean W. Russell; Renae B. Wainwright

(57) ABSTRACT

Chlorinators with multiple spaced gas traps and flow sensors are detailed. The sensors also may be protected, at least somewhat, from contact with scale build ups by interposition of a mechanical barrier. Ramps or other geometric restrictions may be used to increase water flow to some or all of the gas traps. Additionally, the chlorinator housing may be configured so as to route, or focus, gases toward a small-sized, high point thereof.

11 Claims, 4 Drawing Sheets

CHLORINATION SYSTEMS

CROSS-REFERENCE TO RELATED APPLICATION

This application claims the benefit of and priority to U.S. Provisional Patent Application Ser. No. 62/580,200, filed Nov. 1, 2017, and having the same title as appears above, the entire contents of which application are hereby incorporated herein by this reference.

FIELD OF THE INVENTION

This invention relates to chlorination systems and more particularly, but not necessarily exclusively, to salt-water chlorinators having multiple, spaced gas traps, each with a corresponding water-flow sensor.

BACKGROUND OF THE INVENTION

U.S. Pat. No. 8,920,615 to Davidson, et al., whose entire contents are incorporated herein by this reference, describes one version of a salt-water chlorinator for swimming pools and spas. Recognized by the Davidson patent in connection with chlorinators "is that scale (principally calcium salts) deposits and builds up on the cathode" of an electrolysis cell of the chlorinator, "thus reducing the efficiency of chlorine production by the cell." See Davidson, col. 1, ll. 29-32. Accordingly, proposed in the Davidson patent are mechanical scrapers for removing scale from cathodes of the cells.

Also disclosed in the Davidson patent is use of a sensor within a housing of a chlorinator "to sense flow/no flow conditions in the electrolysis cell." See id., col. 3, ll. 37-38. Although not addressed in the Davidson patent, well known in the pool and spa industry is that scale build-up may retain moisture. If scale deposits are present especially between a cathode and a flow sensor, their retained moisture may deceive the sensor into believing water is flowing through a cell when it, in fact, is not. Continuing to operate a chlorinator without water flow through its electrolysis cell may prove to be a safety hazard and thus is undesirable.

Some existing chlorinators utilize a "gas trap" in an effort to determine whether water is flowing through a cell. As electrolytic reactions occur within the cell, chloride ions are converted into chlorine gas (which dissolves into water ultimately to form sodium hypochlorite), with hydrogen gas being liberated at the cathode of the cell. When not adequately removed from the cell by flowing water, these gasses accumulate and may be sensed, directly or indirectly, as indicating lack of water flow through the cell.

Because sensing in these situations requires gas build-up within a cell, gas-trap sensors generally have slow response times. Moreover, they may be subject to false negative readings during periods of low-flow, as water may continue to flow yet at a velocity inadequate to prevent gas accumulation. Formation of a gas trap within a cell also typically requires installation of a chlorinator in a particular orientation which might not permit it to be plumbed conveniently into a pool water-circulation system.

SUMMARY OF THE INVENTION

The present invention seeks to resolve some of the performance issues associated with existing salt-water chlorinators for swimming pools and spas. As one example, the invention may include utilizing two or more gas traps within a cell. The traps may be spaced so as to space the corresponding flow sensors. Further, if desired, logic may be employed requiring both (or all) sensors to sense the existence of water flow before providing electricity to the cell.

A mechanical barrier may inhibit any scale build up from approaching at least one flow sensor. Additionally, the chlorinator housing may be configured so as to route, or focus, gases toward a small-sized, high point thereof. As gas accumulates in the small area, it quickly displaces water so that the water line recedes below a sensor. In this manner, rapid determination of a lack of water flow may be made by the associated sensor.

A geometric restriction, such as a ramp, may be utilized to increase water flow to one or more of the gas traps. The increased flow tends to displace the accumulated gas more quickly, resulting in a cell design able to indicate occurrence of water flow even when the flow is low. Chlorinators of the present invention also may include a level indicator designed to alert an installer or user when a cell either is not level or is installed in an incorrect orientation. The innovative systems additionally may automatically limit chlorine output (below maximum) of the cells when water or air temperatures are low. Chlorine demand by a pool or spa typically is lower at low temperatures, and reducing output helps mitigate reduction in cell life otherwise risked through low-temperature operation.

It thus is an optional, non-exclusive object of the present invention to provide chlorinators utilizing more than one gas trap within their cells.

It is an additional optional, non-exclusive object of the present invention to provide chlorinators whose housings may be configured so as to route, or focus, gases toward a high point thereof.

It is also an optional, non-exclusive object of the present invention to provide chlorinators having more than one water flow sensor, with the sensors being spaced within the cells.

It is another optional, non-exclusive object of the present invention to provide chlorinators configured to require sensing of water flow at more than one location within a cell in order to allow or continue electricity supply to or within the cell.

It is a further optional, non-exclusive object of the present invention to provide chlorinators including barriers designed to inhibit scale build up from approaching at least some water flow sensors.

It is, moreover, an optional, non-exclusive object of the present invention to provide chlorinators comprising geometric restrictions increasing water flow to at least some gas traps.

It is yet another optional, non-exclusive object of the present invention to provide chlorinators including a level indicator.

Other objects, features, and advantages of the present invention will be apparent to those skilled in the relevant art with reference to the remaining text and the drawings of this application.

DETAILED DESCRIPTION

Figure 1:
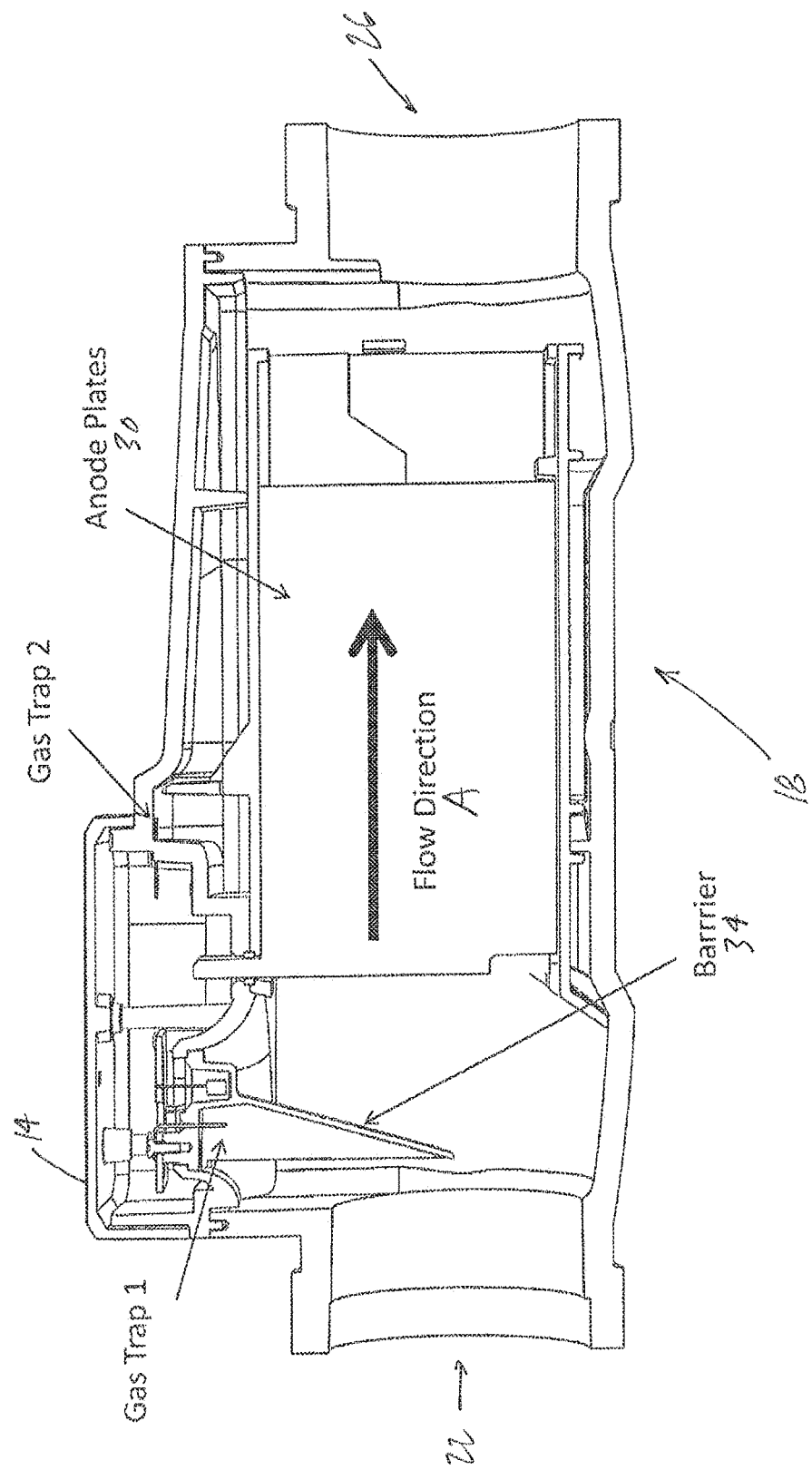
FIGS. 1-3 are schematicized sectional views of a chlorinator consistent with the present invention.
Figure 2:
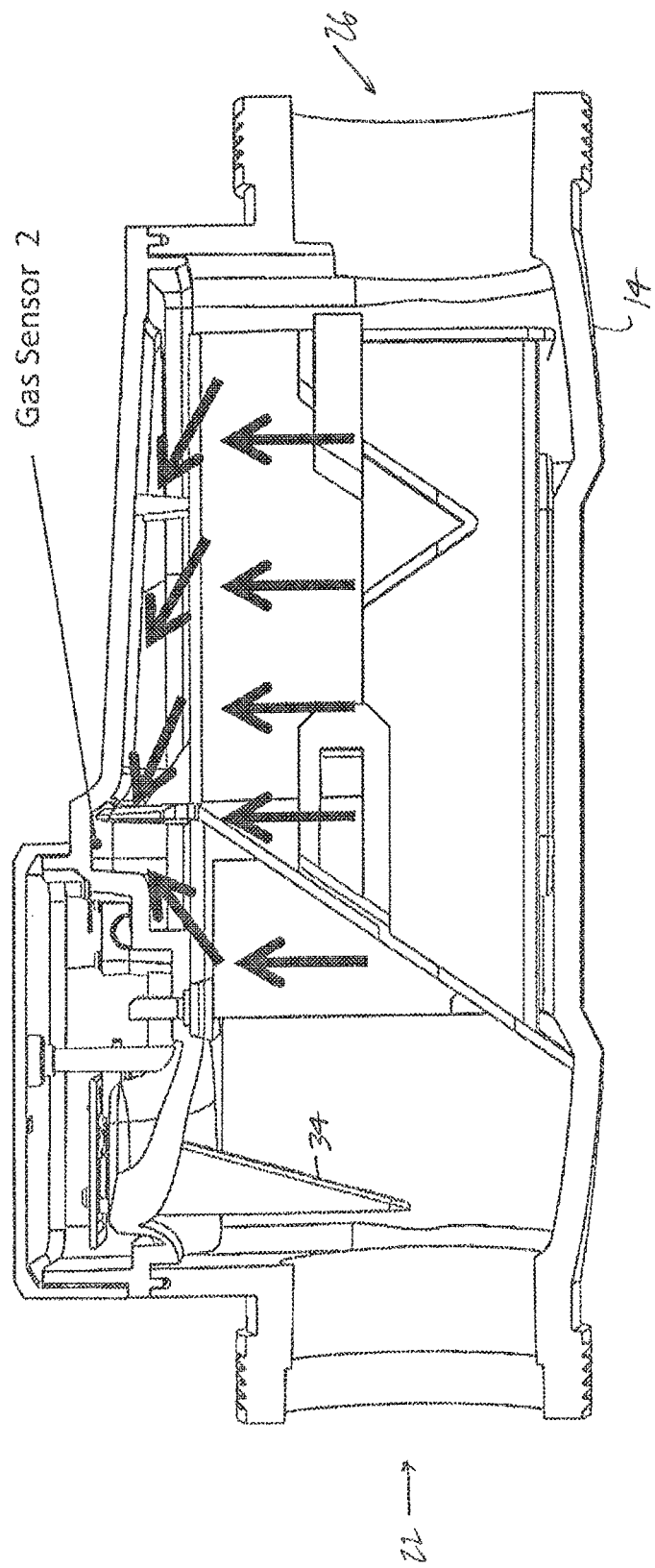
Figure 3:
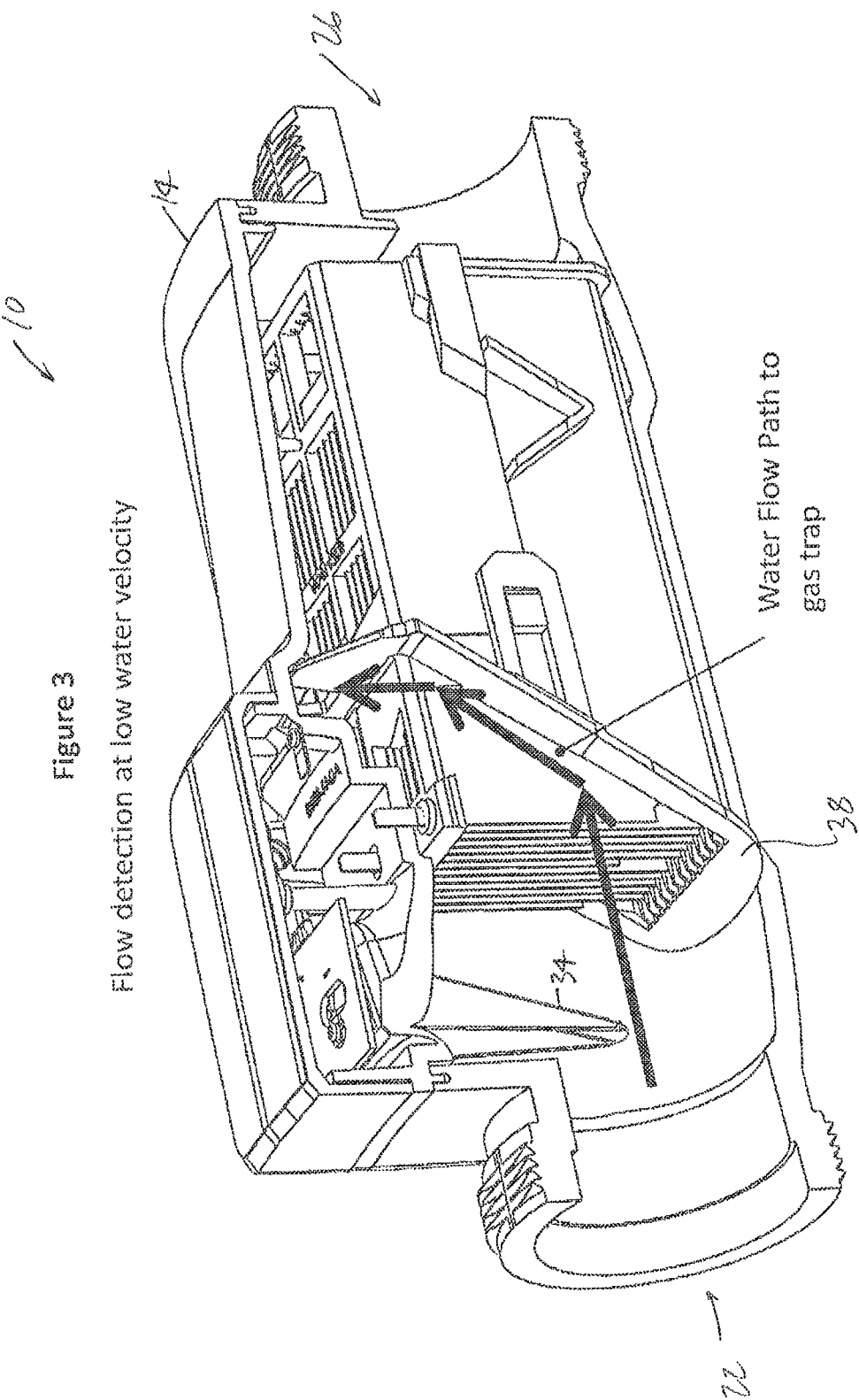

FIGS. 1-4 illustrate various of these features of the invention. In a depicted embodiment of the invention, chlorinator 10 may include housing 14 and electrolysis cell 18. Housing 14 defines inlet 22 and outlet 26, through which circulating water of a swimming pool or spa may pass. The pressurized water hence flows through housing 14 in the direction of arrow A of FIG. 1. As shown in FIGS. 1 and 3, electrolysis cell 18 is positioned within housing 14 so an axis intersecting both water inlet 22 and water outlet 26 passes through electrolysis cell 18.

Cell 18 may include an electrode assembly comprising at least anode plates 30 and a cathode. Also shown are two gas traps 1, 2 spaced within housing 14. Each trap 1, 2 may include a corresponding flow sensor, which therefore also will be spaced within the housing 14. As shown in FIG. 1, gas trap 1 may be positioned upstream of electrolysis cell 18. Electronics of chlorinator 10 may process information provided by either or both of the flow sensors to assess water-flow conditions of cell 18. In some cases, for example, logic may be utilized requiring both sensors to sense the existence of water flow before electricity is provided to cell 18. The electronics may be present on a printed circuit board (PCB) similar to that of the Davidson patent and positioned within housing 14; alternatively, they may be positioned remotely and communicate (via wire or wirelessly) with the flow sensors of traps 1, 2.

Additionally depicted in FIG. 1 is barrier 34 physically separating gas trap 1 from the electrode assembly. Barrier 34 may be any mechanical device suitable for inhibiting scale from approaching or contacting the flow sensor of gas trap 1. FIG. 3 illustrates that barrier 34 may, if desired, be positioned between inlet 22 and the electrode assembly and formed as a scoop configured also to channel pool water toward gas trap 1. As shown in FIG. 3, barrier 34 may be positioned upstream of the electrode assembly so water contacts gas trap 1 without encountering electrolysis cell 18. By virtue of the existence and placement of barrier 34, gas trap 1 may be considered relatively "safe" from detrimental contact by scale.

FIG. 2 illustrates a design of housing 14 causing gases to converge at or near the sensor (denoted "Gas Sensor 2") associated with gas trap 2. In essence, gases may be routed, or focused, toward a small-sized, high point of housing 14 forming trap 2. Such routing is schematically illustrated by the arrows of FIG. 2. In this way, accumulating gas may quickly displace any water present so that the water line recedes below the sensor, allowing the sensor rapidly to determine a low (or lack of) flow condition within cell 14. Accordingly, gas trap 2 may be considered relatively "fast," or "fast acting," in use.

FIG. 3 depicts ramp 38 directing water flowing within housing 14 toward gas trap 2. Ramp 38 (or any other appropriate geometric restriction) hence may increase flow rate to the gas trap 2, removing gas having accumulated there as generated by the plates of the chlorinator 10. Such structure enhances the ability to detect occurrence of water flow even when the flow is low.

Figure 4:
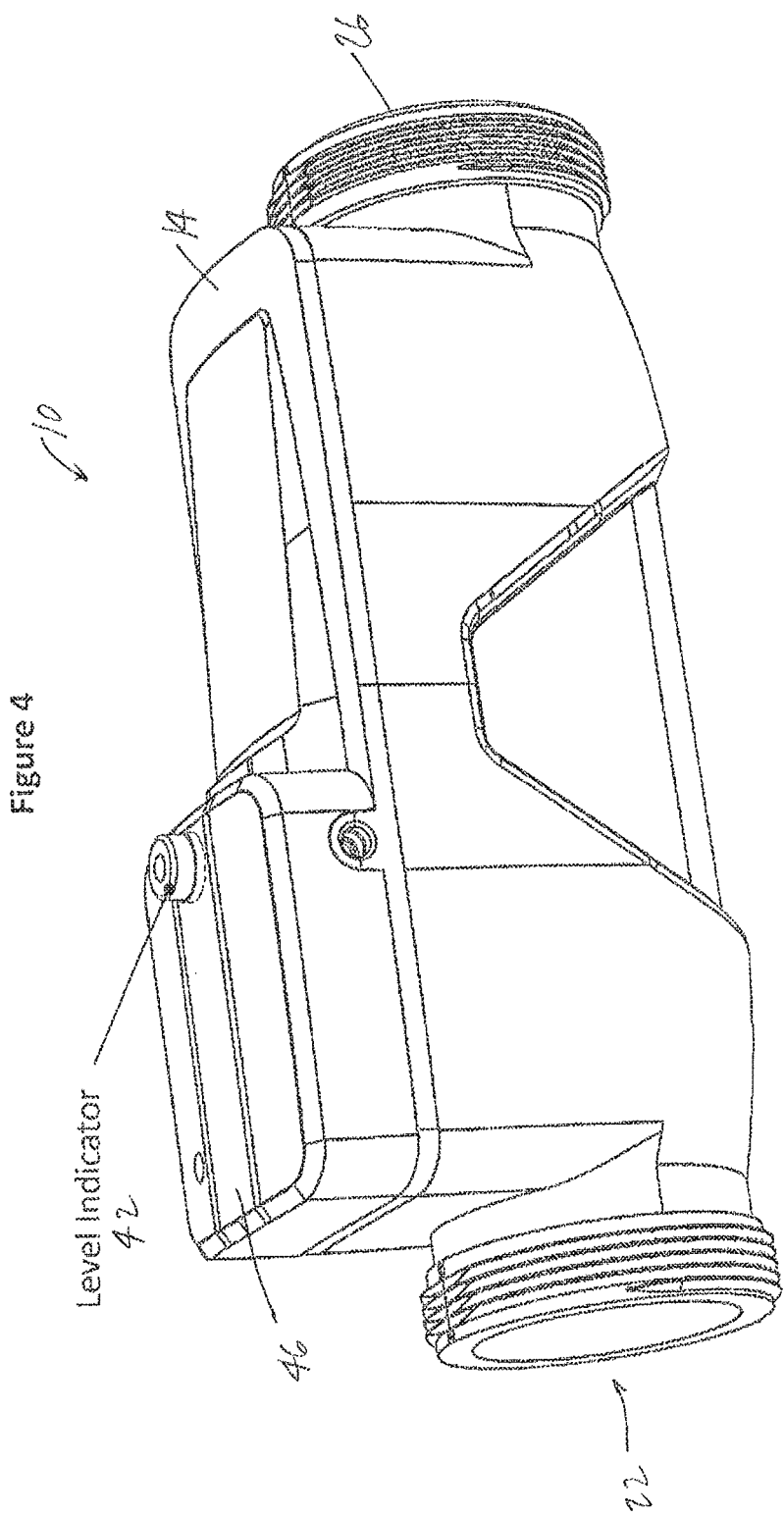
FIG. 4 is a perspective view of the chlorinator of FIGS. 1-3 illustrating, among other things, a level or orientation indicator.

FIG. 4, finally, illustrates an exemplary level/orientation sensor or indicator 42 placed on an exterior surface 46 of housing 14 of chlorinator 10. Orientation indicator 42 may provide a visual (or other) indication of the level/orientation status of the housing 14 as, for example, by illuminating a light when housing 14 is oriented correctly. It thus may alert an installer or user when chlorinator 10 either is not level or is installed correctly. (As an example of improper installation orientation, if chlorinator 10 is installed so that gas traps 1 and 2 are not at or near the top of housing 14, gasses may not travel there.)

The foregoing is provided for purposes of illustrating, explaining, and describing embodiments of the present invention. Modifications and adaptations to these embodiments will be apparent to those skilled in the art and may be made without departing from the scope or spirit of the invention. Finally, references to "pools" and "swimming pools" herein may also refer to spas or other water containing vessels used for recreation or therapy and in connection with salt-water chlorinators are used.

What is claimed is:

1. A salt-water chlorinator comprising:
   a. a housing defining a water inlet and a water outlet;
   b. an electrolysis cell, at least a portion of which is positioned for use within the housing so an axis intersecting both the water inlet and the water outlet passes through the electrolysis cell;
   c. a first gas trap comprising a first sensor positioned within the housing, wherein the first gas trap is positioned upstream of the electrolysis cell; and
   d. a second gas trap (i) spaced from the first gas trap and (ii) comprising a second sensor positioned within the housing.

2. A salt-water chlorinator according to claim 1 in which the electrolysis cell comprises an electrode assembly, further comprising a barrier separating the first sensor from the electrode assembly.

3. A salt-water chlorinator according to claim 2 in which the barrier is formed as a scoop configured to channel water toward the first gas trap.

4. A salt-water chlorinator according to claim 2 in which the barrier is positioned between the water inlet and the electrode assembly.

5. A salt-water chlorinator according to claim 1, further comprising a ramp configured to direct water toward the second gas trap.

6. A salt-water chlorinator according to claim 1, further comprising means for indicating orientation of the housing.

7. A salt-water chlorinator according to claim 1 in which (a) the housing further defines an interior region forming a high point thereof and (b) the second gap trap is located at or adjacent the high point.

8. A salt-water chlorinator according to claim 1, further comprising electronics configured to limit generated chlorine as a function of temperature.

9. A salt-water chlorinator according to claim 1, further comprising electronics configured to prevent supply of electricity to the electrolysis cell unless both the first and second sensors sense water flow.

10. A salt-water chlorinator comprising:
    a. a housing defining a water inlet and a water outlet;
    b. an electrolysis cell comprising an electrode assembly, at least a portion of which is positioned for use within the housing so an axis intersecting both the water inlet and the water outlet passes through the electrolysis cell;
    c. a first gas trap comprising a first flow sensor positioned within the housing, wherein the first gas trap is positioned upstream of the electrolysis cell;
    d. a second gas trap (i) spaced from the first gas trap and (ii) comprising a second flow sensor positioned within the housing;
    e. a barrier (i) separating the first sensor from the electrode assembly, (ii) positioned between the water inlet and the electrode assembly, and (iii) formed as a scoop configured to channel water toward the first gas trap;
    f. a ramp configured to direct water toward the second gas trap; and
    g. means for indicating orientation of the housing.

11. A salt-water chlorinator according to claim 2, wherein the barrier is configured to channel water toward the first gas trap and wherein the barrier is positioned upstream of the electrode assembly so water contacts the first gas trap without encountering the electrolysis cell.

\* \* \* \* \*